United States Patent
Sun et al.

(10) Patent No.: US 9,714,625 B2
(45) Date of Patent: Jul. 25, 2017

(54) SYSTEM AND METHOD FOR CONTROLLING AMMONIA LEVELS IN A SELECTIVE CATALYTIC REDUCTION CATALYST USING A NITROGEN OXIDE SENSOR

(75) Inventors: Min Sun, Troy, MI (US); Kevin L. Perry, Fraser, MI (US); Donovan L. Dibble, Utica, MI (US); Chang H. Kim, Rochester, MI (US); Mary Beth Furness, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1126 days.

(21) Appl. No.: 13/192,859

(22) Filed: Jul. 28, 2011

(65) Prior Publication Data

US 2013/0025261 A1 Jan. 31, 2013

(51) Int. Cl.
*F01N 3/00* (2006.01)
*F02D 41/14* (2006.01)
*F01N 11/00* (2006.01)

(52) U.S. Cl.
CPC ............ *F02D 41/146* (2013.01); *F01N 11/00* (2013.01); *F01N 2560/021* (2013.01);
(Continued)

(58) Field of Classification Search
CPC ............... F01N 11/00; F01N 2560/021; F01N 2560/025; F01N 2560/026; F02D 2041/1468; F02D 41/1443; F02D 41/1446; F02D 41/1454; F02D 41/1461; F02D 41/146; Y02T 10/22; Y02T 10/47
(Continued)

(56) References Cited

U.S. PATENT DOCUMENTS 5,021,227 A  6/1991  Kobayashi et al.
5,746,052 A  5/1998  Kinugasa et al.
(Continued)

FOREIGN PATENT DOCUMENTS

CN  101929374 A  12/2010
DE  10041891 A1  4/2001
(Continued)

OTHER PUBLICATIONS

U.S. Appl. No. 13/157,669, filed Jun. 10, 2011, Sun et al.
(Continued)

*Primary Examiner* — Phutthiwat Wongwian
*Assistant Examiner* — Matthew T Largi (57) ABSTRACT

A system according to the principles of the present disclosure includes an air/fuel ratio determination module and an emission level determination module. The air/fuel ratio determination module determines an air/fuel ratio based on input from an air/fuel ratio sensor positioned downstream from a three-way catalyst that is positioned upstream from a selective catalytic reduction (SCR) catalyst. The emission level determination module selects one of a predetermined value and an input based on the air/fuel ratio. The input is received from a nitrogen oxide sensor positioned downstream from the three-way catalyst. The emission level determination module determines an ammonia level based on the one of the predetermined value and the input received from the nitrogen oxide sensor.

22 Claims, 3 Drawing Sheets

(52) U.S. Cl.
CPC .. *F01N 2560/025* (2013.01); *F01N 2560/026* (2013.01); *F02D 41/1443* (2013.01); *F02D 41/1446* (2013.01); *F02D 41/1454* (2013.01); *F02D 41/1461* (2013.01); *F02D 2041/1468* (2013.01); *Y02T 10/22* (2013.01); *Y02T 10/47* (2013.01)

(58) Field of Classification Search
USPC ............... 60/274, 285, 286, 295, 301, 303
See application file for complete search history.

(56) References Cited

U.S. PATENT DOCUMENTS

| | | | |
|---|---|---|---|
| 5,778,667 A | 7/1998 | Kinugasa et al. | |
| 5,782,087 A | 7/1998 | Kinugasa et al. | |
| 6,109,024 A | 8/2000 | Kinugasa et al. | |
| 6,119,452 A | 9/2000 | Kinugasa et al. | |
| 6,345,496 B1 | 2/2002 | Fuwa et al. | |
| 6,662,552 B1 | 12/2003 | Gunther et al. | |
| 6,775,623 B2 | 8/2004 | Ali et al. | |
| 7,210,288 B2* | 5/2007 | Bandl-Konrad et al. | 60/297 |
| 7,472,545 B2 | 1/2009 | Hemingway et al. | |
| 7,628,009 B2* | 12/2009 | Hu et al. | 60/285 |
| 7,673,444 B2 | 3/2010 | Yano et al. | |
| 8,005,605 B2* | 8/2011 | Yasui | 701/109 |
| 8,041,498 B2 | 10/2011 | Brown et al. | |
| 8,393,140 B2 | 3/2013 | Perry et al. | |
| 2002/0069640 A1 | 6/2002 | Irisawa et al. | |
| 2007/0033928 A1 | 2/2007 | Hu et al. | |
| 2007/0137182 A1 | 6/2007 | Driscoll | |
| 2007/0175208 A1 | 8/2007 | Bandl-Konrad et al. | |
| 2007/0271908 A1 | 11/2007 | Hemingway et al. | |
| 2009/0165442 A1* | 7/2009 | Hara | 60/286 |
| 2009/0199543 A1* | 8/2009 | Sawada et al. | 60/276 |
| 2010/0043402 A1* | 2/2010 | Perry et al. | 60/285 |
| 2010/0057328 A1 | 3/2010 | Brown et al. | |
| 2010/0071347 A1 | 3/2010 | Yoshida et al. | |
| 2010/0107605 A1 | 5/2010 | Brinkman et al. | |
| 2010/0107606 A1 | 5/2010 | Narayanaswamy et al. | |
| 2010/0111794 A1 | 5/2010 | Katoh | |
| 2010/0192545 A1 | 8/2010 | Schmieg et al. | |
| 2010/0242440 A1* | 9/2010 | Garimella | B01D 53/9409 60/276 |
| 2010/0326052 A1 | 12/2010 | Sun | |
| 2011/0041480 A1 | 2/2011 | Yasui et al. | |
| 2012/0102927 A1 | 5/2012 | Hirota | |
| 2012/0117954 A1 | 5/2012 | Yasui et al. | |
| 2012/0167553 A1 | 7/2012 | Qi et al. | |
| 2012/0180558 A1 | 7/2012 | Li et al. | |
| 2012/0222406 A1 | 9/2012 | Sakurai et al. | |
| 2012/0311998 A1 | 12/2012 | Sun et al. | |
| 2012/0316754 A1 | 12/2012 | Narayanaswamy et al. | |
| 2013/0095002 A1 | 4/2013 | In et al. | |
| 2013/0311065 A1 | 11/2013 | Sun et al. | |
| 2014/0013725 A1 | 1/2014 | Sun et al. | |

FOREIGN PATENT DOCUMENTS

| | | |
|---|---|---|
| DE | 102009054046 A1 | 9/2010 |
| EP | 1061244 A2 | 12/2000 |

OTHER PUBLICATIONS

Office Action dated Oct. 18, 2013 from the German Patent Office for German Patent Application No. 10 2012 209 469.5; 7 pages.
David Garrod, Ph.D., Esq.; "Glossary of Judicial Claim Constructions in the Electronics, Computer and Business Method Arts"; p. 257; © 2010 ; 2 pages.

\* cited by examiner

SYSTEM AND METHOD FOR CONTROLLING AMMONIA LEVELS IN A SELECTIVE CATALYTIC REDUCTION CATALYST USING A NITROGEN OXIDE SENSOR

STATEMENT OF GOVERNMENT RIGHTS

This invention was produced pursuant to United States Government Program No. DE-EE0003379 with the Department of Energy (DoE). The U.S. Government has certain rights in this invention.

FIELD

The present disclosure relates to systems and methods for controlling ammonia levels in a selective catalytic reduction catalyst using a nitrogen oxide sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Three-way and selective catalytic reduction (SCR) catalysts reduce emissions in exhaust from an engine. When the air/fuel ratio of the engine is rich or stoichiometric, the three-way catalyst reduces hydrocarbon, carbon monoxide, and nitrogen oxide and produces ammonia, and the SCR catalyst stores the ammonia. When the air/fuel ratio is lean, the three-way catalyst reduces hydrocarbon and carbon monoxide, and the ammonia stored in the SCR catalyst is used to reduce nitrogen oxide. Thus, the amount of ammonia stored in the SCR catalyst decreases when the air/fuel ratio is lean.

Typically, the air/fuel ratio is adjusted to lean to improve fuel economy. Passive SCR systems may switch the air/fuel ratio from lean to rich to increase ammonia storage levels in the SCR catalyst. Active SCR systems inject a dosing agent, such as urea, into exhaust to increase ammonia storage levels in the SCR catalyst. The dosing agent breaks down to form ammonia that is stored in the SCR catalyst.

SUMMARY

A system according to the principles of the present disclosure includes an air/fuel ratio determination module and an emission level determination module. The air/fuel ratio determination module determines an air/fuel ratio based on input from an air/fuel ratio sensor positioned downstream from a three-way catalyst that is positioned upstream from a selective catalytic reduction (SCR) catalyst. The emission level determination module selects one of a predetermined value and an input based on the air/fuel ratio. The input is received from a nitrogen oxide sensor positioned downstream from the three-way catalyst. The emission level determination module determines an ammonia level based on the one of the predetermined value and the input received from the nitrogen oxide sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or, more processors. The computer programs include processor-executable instructions, that are stored on a non-transitory tangible computer readable medium. The computer programs may also include stored data. Non-limiting examples of the non-transitory tangible computer readable medium are nonvolatile memory, magnetic storage, and optical storage.

Engine control systems may estimate an ammonia storage level in a selective catalytic reduction (SCR) catalyst positioned downstream from a three-way catalyst and adjust the air/fuel ratio of an engine based on the ammonia storage level. The ammonia storage level may be estimated based on exhaust flow and ammonia levels in exhaust. The ammonia levels may be estimated based on exhaust temperature and hydrocarbon levels, hydrogen levels, nitrogen oxide levels, and carbon monoxide levels in exhaust entering and/or exiting the three-way catalyst.

Estimating the ammonia levels in this manner requires calibration effort to correlate the ammonia levels and the factors used to estimate the ammonia levels for a specific vehicle application. In addition, estimating the ammonia levels in this manner requires computation power in an engine control unit (ECU) that controls the engine. Calibration effort and additional ECU computation power may increase vehicle costs. The ammonia levels may be measured using an ammonia sensor positioned in the exhaust stream. However, the ammonia sensor may also increase vehicle costs.

Three-way catalysts reduce nitrogen oxide and produce ammonia when the air/fuel ratio is rich. Thus, nitrogen oxide levels in exhaust exiting the three-way catalyst may be near zero when the air/fuel ratio is rich and ammonia levels in exhaust exiting the three-way catalyst may be near zero when the air/fuel ratio is lean. A nitrogen oxide sensor may be used to detect both the nitrogen oxide levels and the ammonia levels.

A system and method according to the present disclosure determines the ammonia level in exhaust from an engine based on input received from an air/fuel ratio sensor and a nitrogen oxide sensor positioned downstream from a three-way catalyst. When the air/fuel ratio sensor indicates that an air/fuel ratio of the engine is stoichiometric or rich, the ammonia level is determined based on the input received from the nitrogen oxide sensor. When the air/fuel ratio sensor indicates that an air/fuel ratio of the engine is lean, the ammonia level is determined to be a predetermined value (e.g., zero).

A system and method according to the present disclosure may estimate an ammonia storage level in an SCR catalyst positioned downstream from the three-way catalyst based on the ammonia level, one or more exhaust temperatures, and an exhaust flow rate. The nitrogen oxide sensor may be positioned at an outlet of the three-way catalyst. The exhaust temperatures may be measured at an inlet and an outlet of the SCR catalyst. The air/fuel ratio of the engine may be switched between rich and lean based on the estimated ammonia storage level.

A system and method according to the present disclosure may determine the ammonia storage level in the SCR catalyst using nitrogen oxide sensors positioned at the inlet of the SCR catalyst and midway between the inlet and the outlet of the SCR catalyst. The air/fuel ratio may be switched to rich or stoichiometric when the ratio of the midpoint ammonia level to the inlet ammonia level is less than a first value. The air/fuel ratio may be switched to lean when a ratio of the midpoint ammonia level to the inlet ammonia level is greater than or equal to a second value. The first and second values may be equal or different, and may be predetermined to maintain the ammonia storage level within a desired range between saturated and depleted.

Determining ammonia levels in exhaust using an air/fuel ratio sensor and a nitrogen oxide sensor positioned downstream from the three-way catalyst requires less calibration effort and less computation power compared to other methods. Determining the ammonia level in this manner also enables detection of high levels of ammonia (e.g., 2,000 ppm). In addition, nitrogen oxides sensors are often used for other diagnostic and control systems, and therefore may not increase vehicle costs. Determining ammonia levels using sensors position at the inlet and the midpoint of the SCR catalyst enables controlling the ammonia storage level without determining the ammonia storage level, requiring even less calibration effort and computation power.

Figure 1:
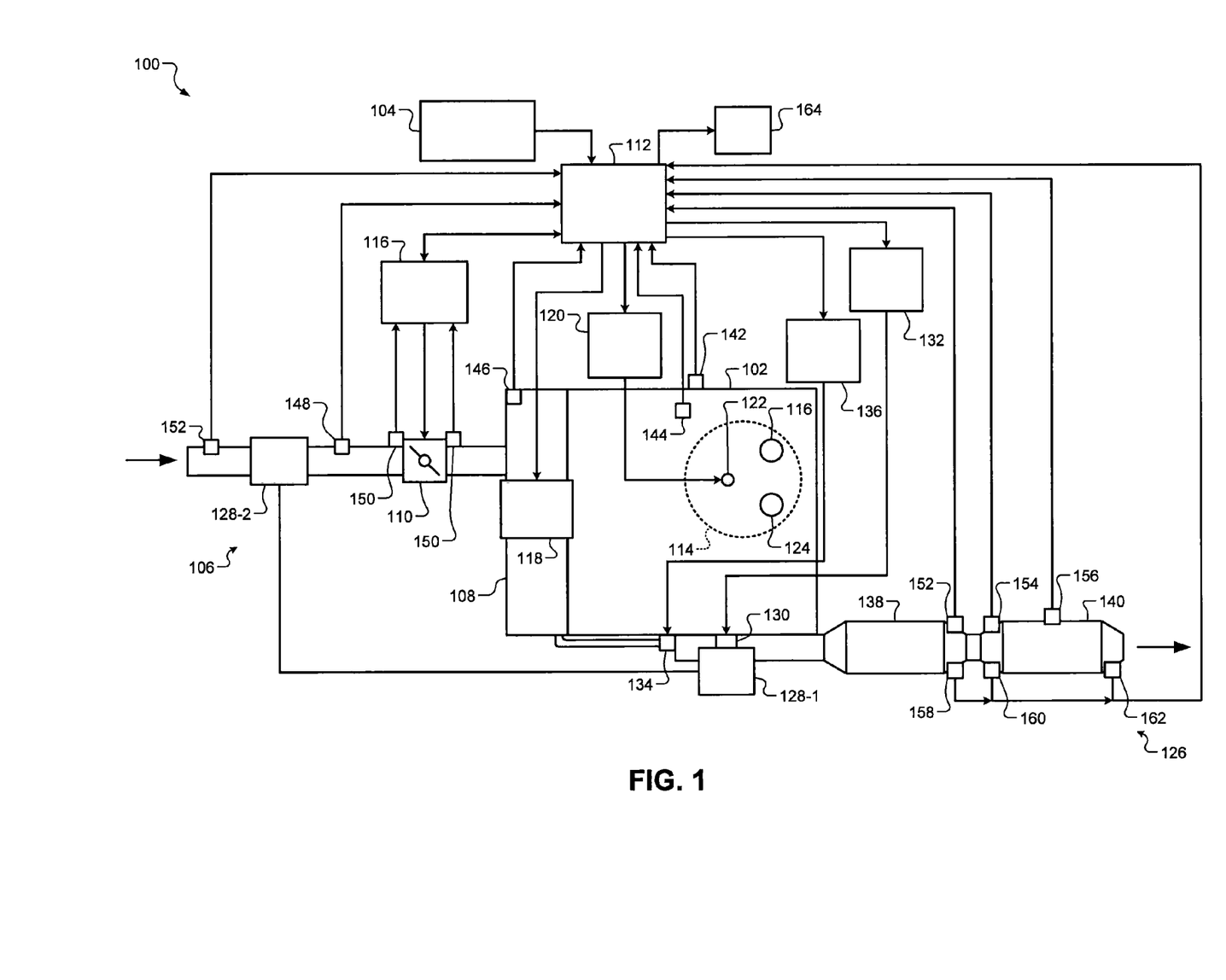
FIG. 1 is a functional block diagram of an example engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into the engine 102 through an intake system 106. For example only, the intake system 106 may include an intake manifold 108 and a throttle valve 110. For example only, the throttle valve 110 may include a butterfly valve having a rotatable blade. An engine control module (ECM) 112 controls a throttle actuator module 116, which regulates opening of the throttle valve 110 to control the amount of air drawn into the intake manifold 108.

Air from the intake manifold 108 is drawn into cylinders of the engine 102. While the engine 102 may include multiple cylinders, for illustration purposes a single representative cylinder 114 is shown. For example only, the engine 102 may include 2, 3, 4, 5, 6, 8, 10, and/or 12 cylinders. The ECM 112 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 114. Therefore, two crankshaft revolutions are necessary for the cylinder 114 to experience all four of the strokes.

During the intake stroke, air from the intake manifold 108 is drawn into the cylinder 114 through an intake valve 117. The ECM 112 controls a fuel actuator module 118, which regulates fuel injection to achieve a desired air/fuel ratio. Fuel may be injected into the intake manifold 108 at a central location or at multiple locations, such as near the intake valve 117 of each of the cylinders. In various implementations (not shown), fuel may be injected directly into the cylinders or into mixing chambers associated with the cylinders. The fuel actuator module 118 may halt injection of fuel to cylinders that are deactivated.

The injected fuel mixes with air and creates an air/fuel mixture in the cylinder 114. During the compression stroke, a piston (not shown) within the cylinder 114 compresses the air/fuel mixture. The engine 102 may be a compression-ignition engine, in which case compression in the cylinder 114 ignites the air/fuel mixture. Alternatively, the engine 102 may be a spark-ignition engine, in which case a spark actuator module 120 energizes a spark plug 122 in the cylinder 114 based on a signal from the ECM 112, which ignites the air/fuel mixture. The timing of the spark may be specified relative to the time when the piston is at its topmost position, referred to as top dead center (TDC).

The spark actuator module 120 may be controlled by a timing signal specifying how far before or after TDC to generate the spark. Because piston position is directly related to crankshaft rotation, operation of the spark actuator module 120 may be synchronized with crankshaft angle. In various implementations, the spark actuator module 120 may halt provision of spark to deactivated cylinders.

Generating the spark may be referred to as a firing event. The spark actuator module 120 may have the ability to vary the timing of the spark for each firing event. The spark actuator module 120 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 124. The byproducts of combustion are exhausted from the vehicle via an exhaust system 126.

The engine system 100 may include a boost device that provides pressurized air to the intake manifold 108. For example, FIG. 1 shows a turbocharger including a hot turbine 128-1 that is powered by hot exhaust gases flowing through the exhaust system 126. The turbocharger also includes a cold air compressor 128-2, driven by the turbine 128-1, which compresses air leading into the throttle valve 110. In various implementations, a supercharger (not shown), driven by the crankshaft, may compress air from the throttle valve 110 and deliver the compressed air to the intake manifold 108.

A wastegate 130 may allow exhaust to bypass the turbine 128-1, thereby reducing the boost (the amount of intake air compression) of the turbocharger. The ECM 112 may control the turbocharger via a boost actuator module 132. The boost actuator module 132 may modulate the boost of the turbocharger by controlling the position of the wastegate 130. In various implementations, multiple turbochargers may be controlled by the boost actuator module 132. The turbocharger may have variable geometry, which may be controlled by the boost actuator module 132.

An intercooler (not shown) may dissipate some of the heat contained in the compressed air charge, which is generated as the air is compressed. The compressed air charge may also have absorbed heat from components of the exhaust system 126. Although shown separated for purposes of illustration, the turbine 128-1 and the compressor 128-2 may be attached to each other, placing intake air in close proximity to hot exhaust.

The engine system 100 may include an exhaust gas recirculation (EGR) valve 134, which selectively redirects exhaust gas back to the intake manifold 108. The EGR valve 134 may be located upstream of the turbocharger's turbine 128-1. The EGR valve 134 may be controlled by an EGR actuator module 136.

The exhaust system 126 includes a three-way catalyst (TWC) 138 and a selective catalytic reduction (SCR) catalyst 140. When the air/fuel ratio of the engine 102 is rich or stoichiometric, the TWC 138 reduces hydrocarbon, carbon monoxide, and nitrogen oxide and produces ammonia, and the SCR catalyst 140 stores the ammonia. When the air/fuel ratio is lean, the TWC 138 reduces hydrocarbon and carbon monoxide and the ammonia stored in the SCR catalyst 140 is used to reduce nitrogen oxide.

The position of the crankshaft may be measured using a crankshaft position (CPS) sensor 142. The ECM 112 may determine the speed of the crankshaft (i.e., the engine speed) based on the crankshaft position. The temperature of the engine coolant may be measured using an engine coolant temperature (ECT) sensor 144. The ECT sensor 144 may be located within the engine 102 or at other locations where the coolant is circulated, such as a radiator (not shown).

The pressure within the intake manifold 108 may be measured using a manifold absolute pressure (MAP) sensor 146. In various implementations, engine vacuum, which is the difference between ambient air pressure and the pressure within the intake manifold 108, may be measured. The mass flow rate of air flowing into the intake manifold 108 may be measured using a mass air flow (MAF) sensor 148. In various implementations, the MAF sensor 148 may be located in a housing that also includes the throttle valve 110. The throttle actuator module 116 may monitor the position of the throttle valve 110 using one or more throttle position sensors (TPS) 150. The ambient temperature of air being drawn into the engine 102 may be measured using an intake air temperature (IAT) sensor 151.

Levels of nitrogen oxide and ammonia in exhaust may be measured using nitrogen oxide (NOx) sensors 152, 154, 156. The NOx sensor 152 is positioned downstream from the TWC 138, such as at an outlet of the TWC 138. The NOx sensor 154 may be positioned at an inlet of the SCR catalyst 140 and the NOx sensor 156 may be positioned midway between the inlet and an outlet of the SCR catalyst 140. Alternatively, the NOx sensor 154 may be positioned at a midpoint of the SCR catalyst 140 and/or the NOx sensor 156 may be positioned at another location downstream from the inlet of the SCR catalyst 140, such as at the outlet of the SCR catalyst 140.

An air/fuel ratio of exhaust from the engine 102 may be measured using an air/fuel ratio (AFR) sensor 158. The AFR sensor 158 is positioned downstream from the TWC 138, such as at an outlet of the TWC 138. Although referred to as an air/fuel ratio sensor, the AFR sensor 158 may be an oxygen sensor or a lambda sensor. Temperatures of exhaust may be measured using temperature sensors 160, 162. The temperature sensors 160, 162 may be positioned at the inlet and the outlet of the SCR catalyst 140, respectively, as shown.

The ECM 112 may use signals from the sensors to make control decisions for the engine system 100 and to identify a malfunction in the engine system 100. The ECM 112 may activate a malfunction indicator light (MIL) 164 when the ECM 112 identifies a malfunction in the engine system 100. When activated, the MIL 164 notifies a driver of a malfunction in the engine system 100. Although the MIL 164 is referred to as a light, the MIL 164 may use indicating mediums other than light, including sound and vibration.

The ECM 112 determines the air/fuel ratio of exhaust exiting the TWC 138 based on input received from the AFR sensor 158. When the air/fuel ratio is lean, the ECM 112 determines that ammonia levels in exhaust exiting the TWC 138 are equal to a predetermined value (e.g., approximately zero). When the air/fuel ratio is rich or stoichiometric, the ECM 112 determines ammonia levels in exhaust exiting the TWC 138 based on input received from one or more of the NOx sensors 152, 154, 156.

Figure 2:
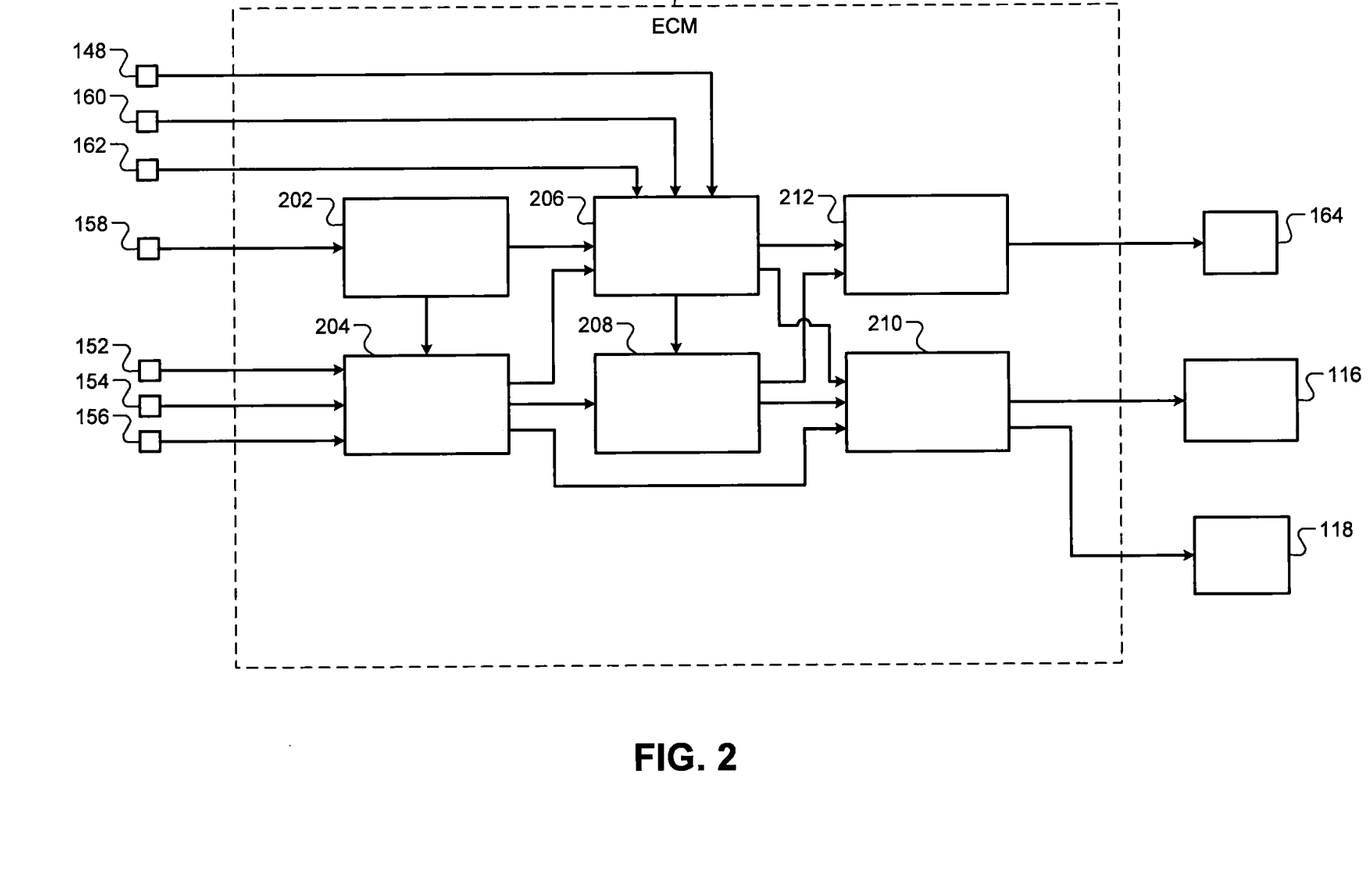
FIG. 2 is a functional block diagram of an example control system according to the principles of the present disclosure.

Referring to FIG. 2, the ECM 112 includes an air/fuel ratio (AFR) determination module 202 and an ammonia level determination module 204. The AFR determination module 202 determines an air/fuel ratio based on input received from the AFR sensor 158. The AFR determination module 202 outputs the air/fuel ratio.

The emission level determination module 204 determines one or more emission levels based on the air/fuel ratio and input received from one or more of the NOx sensors 152, 154, 156. The emission levels include one or more nitrogen oxide levels and one or more ammonia levels. When the air/fuel ratio is lean, the emission level determination module 204 determines the nitrogen oxide levels using the NOx sensors 152, 154, 156 and determines that the ammonia levels are equal to a predetermined value (e.g., approximately zero). When the air/fuel ratio is rich or stoichiometric, the emission level determination module 204 determines that the nitrogen oxide levels are equal to a predetermined value (e.g., approximately zero) and determines the ammonia levels using the NOx sensors 152, 154, 156.

The nitrogen oxide levels may include a TWC outlet NOx level, an SCR inlet NOx level, and a SCR midpoint NOx level determined based on input from the NOx sensors 152, 154, 156, respectively. The ammonia levels may include a TWC outlet NH3 level, an SCR inlet NH3 level, and a SCR midpoint NH3 level determined based on input from the NOx sensors 152, 154, 156, respectively. The ammonia level determination module 204 outputs the nitrogen oxide levels and the ammonia levels.

A storage level estimation module 206 estimates an ammonia storage level in the SCR catalyst 140 based on one or more of the nitrogen oxide levels, one or more of the ammonia levels, one or more exhaust temperatures, and/or an exhaust flow rate. The storage level estimation module 206 may determine SCR inlet and outlet temperatures based on input received from the temperature sensors 160, 162, respectively. The storage level estimation module 206 may determine the exhaust flow rate based on input received from the MAF sensor 148. The storage level estimation module 206 may estimate the ammonia storage level based on the TWC outlet NOx and NH3 levels, the SCR inlet and outlet temperatures, and the exhaust flow rate.

The storage level estimation module 206 may determine NOx and NH3 flow rates based on the TWC outlet NOx and NH3 levels, respectively, and the exhaust flow rate. The storage level estimation module 206 may estimate an ammonia storage efficiency of the SCR catalyst 140 based on the SCR inlet and outlet temperatures. The storage level estimation module 206 may estimate a decrease in the ammonia storage level during a lean period based on a product of the NOx flow rate and the lean period. The storage level estimation module 206 may estimate an increase in the ammonia storage level during a rich period based on a product of the NH3 flow rate, the ammonia storage efficiency, and the rich period. The storage level estimation module 206 outputs the estimated ammonia storage level.

A storage level determination module 208 determines the ammonia storage level based the SCR inlet and midpoint NOx levels, the SCR inlet and midpoint NH3 levels, and the exhaust flow rate. The exhaust flow rate may be received from the storage level estimation module 206. The storage level determination module 208 may determine inlet and midpoint NOx flow rates based on the SCR inlet and midpoint NOx levels, respectively, and the exhaust flow rate. The storage level determination module 208 may determine inlet and midpoint NH3 flow rates based on the SCR inlet and midpoint NH3 levels, respectively, and the exhaust flow rate.

The storage level determination module 208 may determine a decrease in the ammonia storage level during a lean period based on a product of the lean period and a difference between the inlet and midpoint NOx flow rates. The storage level determination module 208 may determine an increase in the ammonia storage level during a rich period based on a product of the rich period and a difference between the inlet and midpoint NH3 flow rates. The storage level determination module 208 outputs the determined ammonia storage level.

An air/fuel ratio (AFR) control module 210 controls the air/fuel ratio of the engine 102 based on the ammonia levels, the estimated ammonia storage level, and/or the determined ammonia storage level. The AFR control module 210 may adjust the air/fuel ratio to rich or stoichiometric when the ratio of the SCR midpoint NH3 level to the SCR inlet NH3 level is less than a first value. The AFR control module 210 may adjust the air/fuel ratio to lean when a ratio of the SCR midpoint NH3 level to the SCR inlet NH3 level is greater than or equal to a second value. The first and second values may be equal or different, and may be predetermined to maintain the ammonia storage level within a desired range between saturated and depleted.

The AFR control module 210 may adjust the air/fuel ratio to rich or stoichiometric when the estimated or determined ammonia storage level is less than a first level. The AFR control module 210 may adjust the air/fuel ratio to lean when the estimated or determined ammonia storage level is greater than or equal to a second level. The first and second levels may be equal or different, and may be predetermined to maintain the ammonia storage level within a desired range between saturated and depleted.

A storage ability determination module 212 determines an ammonia storage ability of the SCR catalyst 140 based on the ammonia storage efficiency of the SCR catalyst 140. The ammonia storage ability of the SCR catalyst 140 may be affected by factors such as contamination, temperature, and thermal degradation. Thus, a change in the ammonia storage efficiency may not indicate a permanent change in the ammonia storage ability if, for example, the change is due to a change in temperature. The storage ability determination module 212 may receive the inlet and midpoint NH3 levels from the storage level estimation module 206 and determine the ammonia storage efficiency based on a ratio of the midpoint NH3 level to the inlet NH3 level.

The storage ability determination module 212 may determine the ammonia storage ability based on the ammonia storage efficiency and a predetermined relationship between ammonia storage efficiency and temperature. The storage ability determination module 212 may determine the ammonia storage ability based on a present storage efficiency at a first temperature and a previous storage efficiency at the first temperature. The storage ability determination module 212 may receive the estimated ammonia storage efficiency from the storage level estimation module 206. The storage ability determination module 212 may determine the ammonia storage ability based on the determined and estimated ammonia storage efficiencies.

The storage ability determination module 212 may activate the MIL 164 when the ammonia storage ability decreases, for example, due to factors other than temperature. The storage ability determination module 212 may activate the MIL 164 when the determined ammonia storage efficiency is less than the estimated ammonia storage efficiency.

Figure 3:
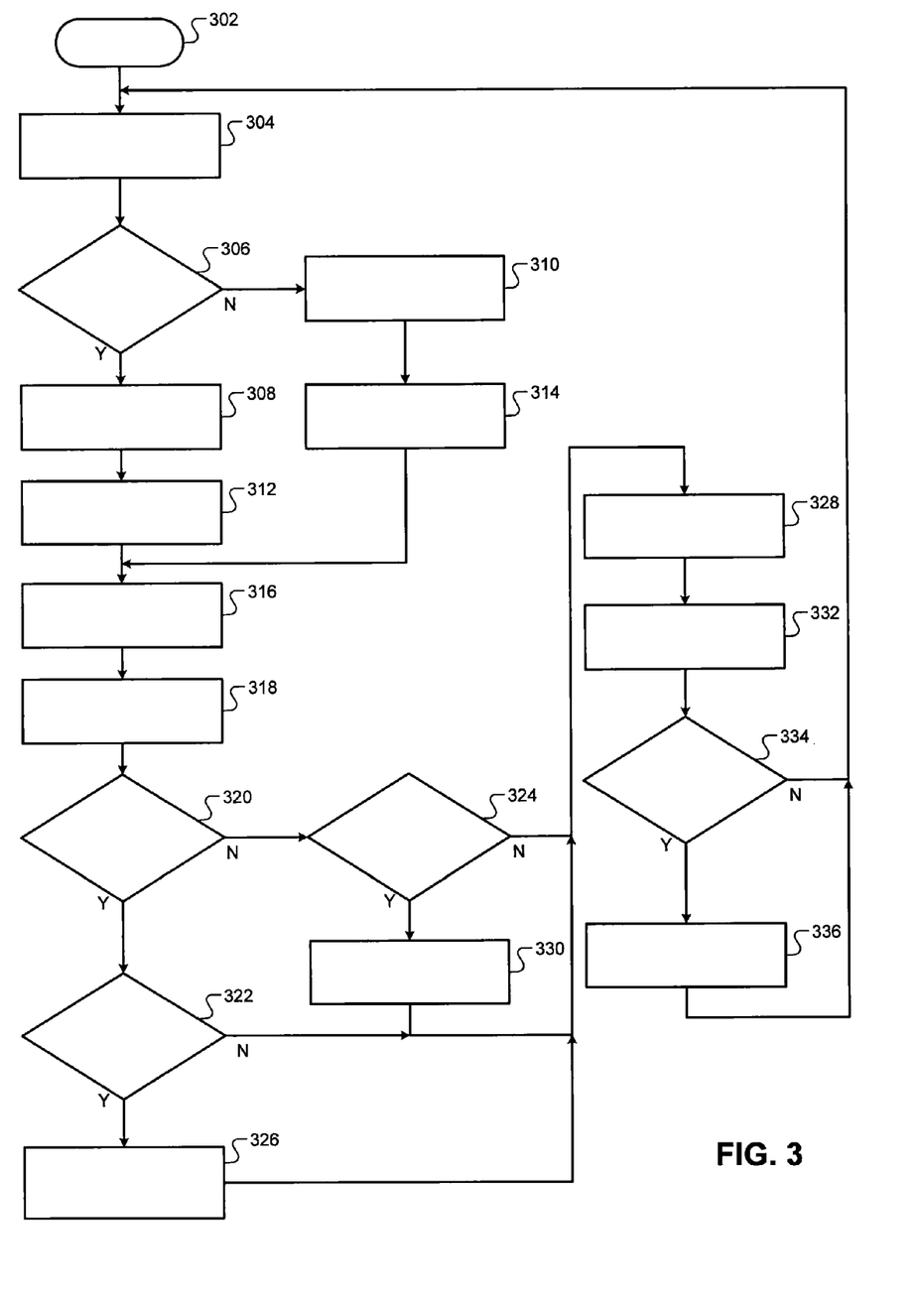
FIG. 3 is a flowchart illustrating an example method according to the principles of the present disclosure.

Referring now to FIG. 3, a method for controlling ammonia levels in a SCR catalyst using a NOx sensor begins at 302. At 304, the method determines an air/fuel ratio of exhaust from an engine. The method may determine the air/fuel ratio based on an AFR sensor positioned downstream from a TWC.

At 306, the method determines whether the air/fuel ratio is lean. If 306 is true, the method continues at 308. If 306 is false, the method continues at 310. At 308, the method determines that ammonia levels in exhaust from the engine are equal to a predetermined value (e.g., approximately zero). At 312, the method determines one or more nitrogen oxide levels based on input received from one or more NOx sensors positioned downstream from the TWC.

At 310, the method determines one or more ammonia levels based on input received from the NOx sensors. At 314, the method determines that the nitrogen oxide levels are equal to a predetermined value (e.g., approximately zero). The NOx sensors may be positioned at an outlet of the TWC, at an inlet of the SCR catalyst, and at a midpoint of the SCR catalyst between the inlet of the SCR catalyst and an outlet of the SCR catalyst.

At 316, the method estimates an ammonia storage level in the SCR catalyst. The method may estimate the ammonia storage level based on decreases in the ammonia storage level when the air/fuel ratio is lean and increases in the ammonia storage level when the air/fuel ratio is rich or stoichiometric. The decreases may be estimated based on a TWC outlet NOx level and an exhaust flow rate. The increases may be estimated based on a TWC outlet NH3 level, an exhaust temperature, and the exhaust flow rate.

At 318, the method determines the ammonia storage level. The method may determine the ammonia storage level based on decreases in the ammonia storage level when the air/fuel ratio is lean and increases in the ammonia storage level when the air/fuel ratio is rich or stoichiometric. The decreases may be determined based on an exhaust flow rate and a difference between a SCR inlet NOx level and a SCR midpoint NOx level. The increases may be determined based on the exhaust flow rate and a difference between a SCR inlet NH3 level and a SCR midpoint NH3 level.

At 320, the method determines whether the air/fuel ratio is lean. If 320 is true, the method continues at 322. If 320 is false, the method continues at 324. At 322, the method determines whether the ammonia storage level is less than a first level. Alternatively, the method may determine whether a ratio of the SCR midpoint NH3 level to the SCR inlet NH3 level is less than a first value. If 322 is true, the method continues at 326. If 322 is false, the method continues at 328. At 326, the method adjusts the air/fuel ratio to rich or stoichiometric.

At 324, the method determines whether the ammonia storage level is greater than or equal to a second level. Alternatively, the method may determine whether the ratio of the SCR midpoint NH3 level to the SCR inlet NH3 level is greater than or equal to a second value. If 324 is true, the method continues at 330. If 324 is false, the method continues at 328. At 330, the method switches the air/fuel ratio to lean.

The first and second levels may be equal or different and the first and second values may be equal or different. The first and second levels and the first and second values may be predetermined to maintain the ammonia storage level within a desired range between saturated and depleted.

At 328, the method estimates an ammonia storage efficiency of the SCR catalyst. The method may estimate the ammonia storage efficiency based on the exhaust temperature. The exhaust temperature may include a SCR inlet temperature and a SCR outlet temperature.

At 332, the method determines the ammonia storage efficiency. The method may determine the ammonia storage efficiency based on a difference between a SCR inlet NH3 flow rate and a SCR midpoint NH3 flow rate. The SCR inlet NH3 flow rate and the SCR midpoint NH3 flow rate may be determined based on the SCR inlet NH3 level and the SCR midpoint NH3 level, respectively, and the exhaust flow rate.

At 334, the method determines whether the determined ammonia storage efficiency is less than the estimated ammonia storage efficiency. The method may determine whether a difference between the determined ammonia storage efficiency and the estimated ammonia storage efficiency is greater than a predetermined value. If 334 is true, the method continues at 336. If 334 is false, the method continues at 304.

At 336, the method activates a malfunction indicator light. The method may activate the malfunction indicator light to notify a driver of a decrease in an ammonia storage ability of the SCR catalyst. The ammonia storage ability of the SCR catalyst may be decreased due to contamination and/or thermal degradation.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a first electronic circuit configured to determine an air/fuel ratio based on an input from an air/fuel ratio sensor positioned downstream from a three-way catalyst that is positioned upstream from a selective catalytic reduction (SCR) catalyst;
    a second electronic circuit configured to:
        determine an ammonia level based on an input received from at least one nitrogen oxide (NOx) sensor positioned downstream from the three-way catalyst when the air/fuel ratio is rich; and
        determine that the ammonia level is equal to a predetermined value when the air/fuel ratio is lean; and
    a third electronic circuit configured to control an actuator of an engine to adjust the air/fuel ratio based on the ammonia level, wherein:
        the at least one NOx sensor includes a first NOx sensor positioned at an inlet of the SCR catalyst and a second NOx sensor positioned downstream from the inlet of the SCR catalyst;
        the second electronic circuit is configured to determine a first ammonia level and a second ammonia level based on an input received from the first NOx sensor and the second NOx sensor, respectively,
        the third electronic circuit is configured to adjust the air/fuel ratio to one of stoichiometric and rich when a ratio of the second ammonia level to the first ammonia level is less than a first predetermined value; and
        the third electronic circuit is configured to adjust the air/fuel ratio to lean when the ratio of the second ammonia level to the first ammonia level is greater than or equal to a second predetermined value.

2. The system of claim 1 wherein the predetermined value is approximately zero.

3. The system of claim 1 wherein the second NOx sensor is positioned at an outlet of the three-way catalyst.

4. The system of claim 3 further comprising a fourth electronic circuit configured to estimate an ammonia storage level in the SCR catalyst based on the ammonia level, an exhaust temperature, and an exhaust flow rate.

5. The system of claim 4 wherein the third electronic circuit is configured to adjust the air/fuel ratio to one of stoichiometric and rich when the ammonia storage level is less than a first predetermined level and adjusts the air/fuel ratio to lean when the ammonia storage level is greater than or equal to a second predetermined level.

6. The system of claim 1 further comprising a fourth electronic circuit configured to determine an ammonia storage level in the SCR catalyst based on the first ammonia level and the second ammonia level.

7. The system of claim 1 further comprising a fourth electronic circuit configured to determine an ability of the SCR catalyst to store ammonia based on the first ammonia level and the second ammonia level.

8. The system of claim 1 wherein the first, second, and third electronic circuits include at least one of an Application Specific Integrated Circuit (ASIC), a combinational logic circuit, a field programmable gate array (FPGA), a processor, and memory.

9. A method comprising:
   determining an air/fuel ratio based on an input from an air/fuel ratio sensor positioned downstream from a three-way catalyst that is positioned upstream from a selective catalytic reduction (SCR) catalyst;
   determining an ammonia level based on an input received from at least one nitrogen oxide (NOx) sensor positioned downstream from the three-way catalyst when the air/fuel ratio is rich, wherein the at least one NOx sensor includes a first NOx sensor positioned at an inlet of the SCR catalyst and a second sensor NOx positioned downstream from the inlet of the SCR catalyst;
   determining that the ammonia level is equal to a predetermined value when the air/fuel ratio is lean;
   controlling an actuator of an engine to adjust the air/fuel ratio based on the ammonia level;
   determining a first ammonia level and a second ammonia level based on an input received from the first NOx sensor and the second NOx sensor, respectively;
   adjusting the air/fuel ratio to one of stoichiometric and rich when a ratio of the second ammonia level to the first ammonia level is less than a first predetermined value; and
   adjusting the air/fuel ratio to lean when the ratio of the second ammonia level to the first ammonia level is greater than or equal to a second predetermined value.

10. The method of claim 9 wherein the predetermined value is approximately zero.

11. The method of claim 9 wherein the second NOx sensor is positioned at an outlet of the three-way catalyst.

12. The method of claim 11 further comprising estimating an ammonia storage level in the SCR catalyst based on the ammonia level, an exhaust temperature, and an exhaust flow rate.

13. The method of claim 12 further comprising:
   adjusting the air/fuel ratio to one of stoichiometric and rich when the ammonia storage level is less than a first predetermined level; and
   adjusting the air/fuel ratio to lean when the ammonia storage level is greater than or equal to a second predetermined level.

14. The method of claim 9 further comprising determining an ammonia storage level in the SCR catalyst based on the first ammonia level and the second ammonia level.

15. The method of claim 9 further comprising determining an ability of the SCR catalyst to store ammonia based on the first ammonia level and the second ammonia level.

16. A system comprising:
   a first electronic circuit configured to:
      determine a first ammonia level based on an input received from a first nitrogen oxide (NOx) sensor positioned at an inlet of a selective catalytic reduction (SCR) catalyst; and
      determine a second ammonia level based on an input received from a second NOx sensor positioned downstream from the inlet of the SCR catalyst;
   a second electronic circuit configured to:
      determine an ammonia storage efficiency of the SCR catalyst based on the first and second ammonia levels; and
      determine an ability of the SCR catalyst to store ammonia based on the ammonia storage efficiency of the SCR catalyst and a temperature of the SCR catalyst; and
   a third electronic circuit configured to control an actuator of an engine to adjust an air/fuel ratio based on at least one of the first and second ammonia levels.

17. The system of claim 16 wherein the second electronic circuit determines the ammonia storage ability of the SCR catalyst based on a current value of the ammonia storage efficiency at the temperature of the SCR catalyst and a previous value of the ammonia storage efficiency at the same temperature of the SCR catalyst.

18. The system of claim 16 further comprising a fourth electronic circuit configured to estimate the ammonia storage efficiency of the SCR catalyst based on the temperature of the SCR catalyst, wherein the second electronic circuit determines the ammonia storage ability of the SCR catalyst based on the determined and estimated ammonia storage efficiencies.

19. The system of claim 16 wherein the first and second electronic circuits include at least one of an Application Specific Integrated Circuit (ASIC), a combinational logic circuit, a field programmable gate array (FPGA), a processor, and memory.

20. A method comprising:
   determining a first ammonia level based on an input received from a first nitrogen oxide (NOx) sensor positioned at an inlet of a selective catalytic reduction (SCR) catalyst;
   determining a second ammonia level based on an input received from a second NOx sensor positioned downstream from the inlet of the SCR catalyst;
   determining an ammonia storage efficiency of the SCR catalyst based on the first and second ammonia levels;
   determining an ability of the SCR catalyst to store ammonia based on the ammonia storage efficiency of the SCR catalyst and a temperature of the SCR catalyst; and
   controlling an actuator of an engine to adjust an air/fuel ratio based on at least one of the first and second ammonia levels.

21. The method of claim 20 further comprising determining the ammonia storage ability of the SCR catalyst based on a current value of the ammonia storage efficiency at the temperature of the SCR catalyst and a previous value of the ammonia storage efficiency at the same temperature of the SCR catalyst.

22. The method of claim 20 further comprising:
   estimating the ammonia storage efficiency of the SCR catalyst based on the temperature of the SCR catalyst; and
   determining the ammonia storage ability of the SCR catalyst based on the determined and estimated ammonia storage efficiencies.

* * * * *